(12) United States Patent
Segelken (10) Patent No.: US 7,047,397 B2
(45) Date of Patent: May 16, 2006

(54) METHOD AND APPARATUS TO EXECUTE AN INSTRUCTION WITH A SEMI-FAST OPERATION IN A STAGGERED ALU

(75) Inventor: Ross A. Segelken, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 421 days.

(21) Appl. No.: 10/243,440

(22) Filed: Sep. 13, 2002

(65) Prior Publication Data

US 2004/0054875 A1  Mar. 18, 2004

(51) Int. Cl.
*G06F 9/302* (2006.01)
*G06F 9/305* (2006.01)

(52) U.S. Cl. ...................... 712/221; 712/223
(58) Field of Classification Search ............... 712/221, 712/223; 713/401; 708/209, 490
See application file for complete search history.

(56) References Cited

U.S. PATENT DOCUMENTS

| | | | | |
|---|---|---|---|---|
| 4,639,886 A | * | 1/1987 | Hashimoto et al. | 708/521 |
| 5,509,130 A | * | 4/1996 | Trauben et al. | 712/215 |
| 5,564,014 A | * | 10/1996 | Yamashita et al. | 714/17 |
| 5,808,623 A | * | 9/1998 | Hamburg | 345/619 |
| 5,956,511 A | * | 9/1999 | Tahara | 717/129 |
| 6,658,578 B1 | * | 12/2003 | Laurenti et al. | 713/324 |

* cited by examiner

*Primary Examiner*—Daniel H. Pan
(74) *Attorney, Agent, or Firm*—Larry M. Mennemeier (57) ABSTRACT

A method for executing an instruction with a semi-fast operation in a staggered ALU. The method of one embodiment comprises generating a first operation and a second operation from a micro-instruction. The first and second operations are scheduled for execution in a staggered arithmetic logic unit (ALU). The first and second operations are separated by N clock cycles. Data from the first operation is communicated to the second operation for use with execution of the second operation.

13 Claims, 6 Drawing Sheets

METHOD AND APPARATUS TO EXECUTE AN INSTRUCTION WITH A SEMI-FAST OPERATION IN A STAGGERED ALU

FIELD OF THE INVENTION

The present invention relates generally to the field of microprocessors and computer systems. More particularly, the present invention relates to a method and apparatus to execute an instruction with a semi-fast operation in a staggered arithmetic logic unit (ALU).

BACKGROUND OF THE INVENTION

Computer systems have become increasingly pervasive in our society. The processing capabilities of computers have increased the efficiency and productivity of workers in a wide spectrum of professions. As the costs of purchasing and owning a computer continues to drop, more and more consumers have been able to take advantage of newer and faster machines. Furthermore, many people enjoy the use of notebook computers because of the freedom. Mobile computers allow users to easily transport their data and work with them as they leave the office or travel. This scenario is quite familiar with marketing staff, corporate executives, and even students.

A processor technology advances, newer software code is also being generated to run on machines with these processors. Users generally expect and demand higher performance from their computers regardless of the type of software being used. One such issue can arise from the kinds of instructions and operations that are actually being performed within the processor. Certain types of operations require more time to complete based on the complexity of the operations and/or type of circuitry needed. This provides an opportunity to optimize the way certain complex operations are executed inside the processor.

One visible characteristic of the increasing performance of newer processors is the higher clock frequencies. With higher clock rates, the internal logic and circuitry of these processors operate faster to process and execute incoming software instructions. Improvements to the logic are needed in order to handle the different clock speeds as the frequency changes are not transparent to the circuitry. Another measure taken by circuit designers to improve performance is to introduce alternative logic units. For example, a staggered ALU may be employed to facilitate the execution of optimized low latency instructions. Ideally, all instructions would be processed as fast as possible. However, a traditional staggered ALU is not capable of handling every instruction, especially the more complex instructions, as certain functions have been excluded from the ALU in order to increase pipeline throughput. As a result, slower execution units that require many more clock cycles to process an instruction, but support special instructions, have still been necessary in some processor architectures.

BRIEF DESCRIPTION OF THE DRAWINGS

The present invention is illustrated by way of example and not limitations in the figures of the accompanying drawings, in which like references indicate similar elements, and in which.

DETAILED DESCRIPTION

A method and apparatus for a executing an instruction with a semi-fast operation in a staggered ALU is disclosed. The embodiments described herein are described in the context of a microprocessor, but are not so limited. Although the following embodiments are described with reference to a processor, other embodiments are applicable to other types of integrated circuits and logic devices. The same techniques and teachings of the present invention can easily be applied to other types of circuits or semiconductor devices that can benefit from higher pipeline throughput and improved performance. The teachings of the present invention are applicable to any processor or machine that performs data manipulation. However, the present invention is not limited to processors or machines that perform 64 bit or 32 bit data operations and can be applied to any processor and machine in which data shifting is needed.

In the following description, for purposes of explanation, numerous specific details are set forth in order to provide a thorough understanding of the present invention. One of ordinary skill in the art, however, will appreciate that these specific details are not necessary in order to practice the present invention. In other instances, well known electrical structures and circuits have not been set forth in particular detail in order to not necessarily obscure the present invention.

In today's processors, a number of different execution units are used to process and execute a variety of code and instructions. Not all instructions are created equal as some are quicker to complete while others can take an enormous number of clock cycles. The faster the throughput of instructions, the better the overall performance of the processor. Thus it would be advantageous to have as many instructions execute as fast as possible. However, there are certain instructions that have greater complexity and require more in terms of execution time and processor resources. For example, there are floating point instructions, load/store operations, data moves, etc.

Some instructions such as the shift right, rotate right, rotate left, conditional move, byte swaps, flag manipulations, require the access to higher order bits and flag values in order to complete the processing of the lower order bits. For instance, an execution unit receives an instruction to shift right a 64 bit data operand by five bits. In order to complete the shift on the lower 32 bits, five bits from the higher 32 bits are needed. This situation presents a challenge in a staggered ALU type of execution unit where the execution logic executes an instruction in staggered portions. So for this example, a staggered ALU operates on the lower 32 bits first, then the higher 32 bits, and finally the flag values. However, if processor architecture does not allow for accessing the higher 32 bits by the lower 32 bits logic of a fast ALU, the shift operation on the lower 32 bits cannot complete successfully in a staggered ALU. This shift right would have to be sent to a slow ALU for processing, which can take an enormously greater number of clock cycles than an instruction processed with a fast ALU.

Embodiments of the present invention provide a way to execute an instruction with a semi-fast operation in a staggered ALU. A slow, complex instruction can then be processed in a fast, staggered ALU instead of being sent to a slow ALU. This can also free up processor resources at the slow ALU for instructions that can absolutely not be operated on elsewhere. For one embodiment, a slow microinstruction defined as capable of being reformed to execute as a sequence of semi-fast operations is filtered at the scheduler. Instead of dispatching the micro-instruction for execution, the scheduler generates a sequence of faster operations to be executed in place of the micro-instruction. These faster operation are capable of being executed in the staggered ALU and do not require the additional resources of a slow ALU. The results of the sequence after being processed at the fast ALU are the same what the results would be if the slow micro-instruction was processed at the slow ALU. Because the sequence of operations can be executed on the fast ALU, the overall execution time can be much shorter than if the micro-instruction was processed at the slow ALU.

The sequence of operations is arranged such that the necessary timing between each operation can properly receive and use data from its immediately preceding operation in the staggered ALU. For one embodiment, the operations are separated by a predefined number of clock cycles. Furthermore, an embodiment of a staggered ALU in accordance with the present invention is wired to propagate data bits from the higher order bits logic and flags logic back to the lower order bits logic. So for the above right shift example, the lower order 32 bit logic of the staggered ALU can access the needed five data bits of the higher order 32 bit logic.

Figure 1:
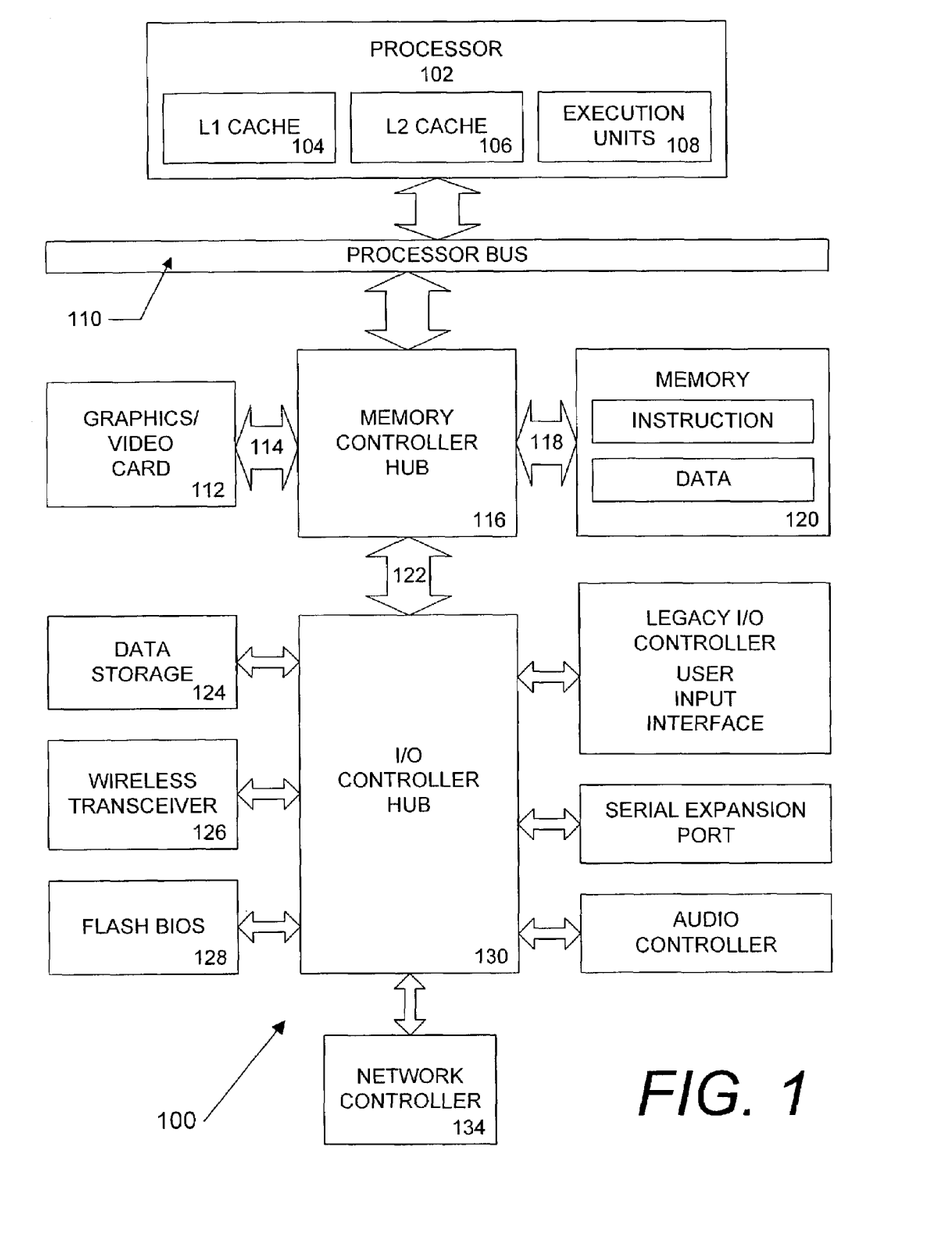
FIG. 1 is a block diagram of a computer system formed with a processor that includes execution units to execute an instruction with a semi-fast operation in a staggered ALU in accordance with one embodiment of the present invention.

Referring now to FIG. 1, an exemplary computer system 100 is shown. System 100 includes a component, such as a processor 102 to employ execution units, including a staggered ALU, in accordance with the present invention, such as in the embodiment described herein. System 100 is representative of processing systems based on the PENTIUM® III, PENTIUM® 4, Itanium™, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 100 may execute a version of the WINDOWS™ operating system available from Microsoft Corporation of Redmond, Wash., although other operating systems (UNIX and Linux for example), embedded software, and/or graphical user interfaces, may also be used. Thus, the present invention is not limited to any specific combination of hardware circuitry and software.

The present enhancement is not limited to computer systems. Alternative embodiments of the present invention can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that performs operations on operands. Furthermore, some architectures have been implemented to enable instructions to operate on several data simultaneously to improve the efficiency of multimedia applications. As the type and volume of data increases, computers and their processors have to be enhanced to manipulate data in more efficient methods.

FIG. 1 is a block diagram of a computer system 100 formed with a processor 102 that includes execution units 108 in accordance with the present invention. The present embodiment is described in the context of a single processor desktop or server system, but alternative embodiments can be included in a multiprocessor system. System 100 is an example of a hub architecture. The computer system 100 includes a processor 102 to process data signals. The processor 102 can be a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 102 is coupled to a processor bus 110 that can transmit data signals between the processor 102 and other components in the system 100. The elements of system 100 perform their conventional functions that are well known to those familiar with the art.

In one embodiment, the processor 102 includes a Level 1 (L1) internal cache memory 104 and a Level 2 (L2) internal cache memory 106. Depending on the architecture, the processor 102 can have a single internal cache or multiple levels of internal cache. Alternatively, in another embodiment, the cache memory can reside external to the processor 102. Other embodiments can also include a combination of both internal and external caches depending on the particular implementation and needs. Execution units 108, including a staggered ALU, also resides in the processor 102. Alternate embodiments of an execution unit 108 can also be used in micro controllers, embedded processors, graphics devices, DSPs, and other types of logic circuits. System 100 includes a memory 120. Memory 120 can be a dynamic random access memory (DRAM) device, a static random access memory (SRAM) device, flash memory device, or other memory device. Memory 120 can store instructions and/or data represented by data signals that can be executed by the processor 102.

A system logic chip 116 is coupled to the processor bus 110 and memory 120. The system logic chip 116 in the illustrated embodiment is a memory controller hub (MCH). The processor 102 can communicate to the MCH 116 via a processor bus 110. The MCH 116 provides a high bandwidth memory path 118 to memory 120 for instruction and data storage and for storage of graphics commands, data and textures. The MCH 116 is to direct data signals between the processor 102, memory 120, and other components in the system 100 and to bridge the data signals between processor bus 110, memory 120, and system I/O 122. In some embodiments, the system logic chip 116 can provide a graphics port for coupling to a graphics controller 112. The MCH 116 is coupled to memory 120 through a memory interface 118. The graphics card 112 is coupled to the MCH 116 through an Accelerated Graphics Port (AGP) interconnect 114.

System 100 uses a proprietary hub interface bus 122 to couple the MCH 116 to the I/O controller hub (ICH) 130. The ICH 130 provides direct connections to some I/O devices via a local I/O bus. The local I/O bus is a high-speed I/O bus for connecting peripherals to the memory 120, chipset, and processor 202. Some examples are the audio controller, firmware hub (flash BIOS) 128, wireless transceiver 126, data storage 124, legacy I/O controller containing user input and keyboard interfaces, a serial expansion port such as Universal Serial Bus (USB), and a network controller 134. The data storage device 124 can comprise a hard disk drive, a floppy disk drive, a CD-ROM device, a flash memory device, or other mass storage device.

For another embodiment of a system, an execution unit to execute an instruction with a semi-fast operation can be used with a system on a chip. One embodiment of a system on a chip comprises of a processor and a memory. The memory for one such system is a flash memory. The flash memory can be located on the same die as the processor and other system components. Additionally, other logic blocks such as a memory controller or graphics controller can also be located on a system on a chip.

Figure 2:
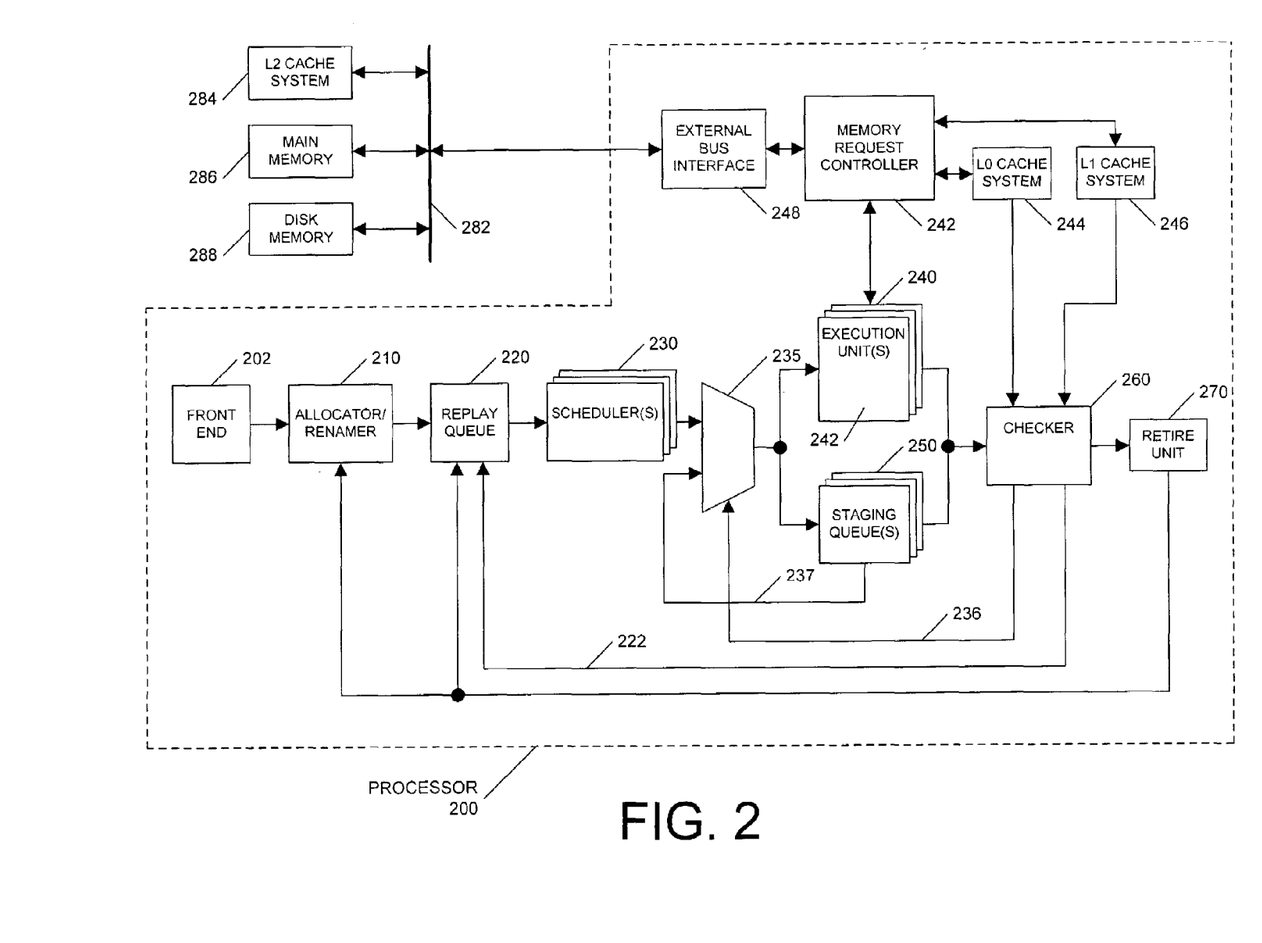
FIG. 2 is a block diagram of a processor that includes an embodiment of the present invention.

FIG. 2 is a block diagram of a processor 200 that includes an embodiment of an execution unit 240 to perform semi-fast operations in accordance the present invention. The front end 202 of the processing phase is coupled to schedulers 230 via allocator/renamer 210 and a rescheduler replay queue 220. Instructions can be dispatched speculatively from the schedulers 230. Thus the schedulers 230 can dispatch an instruction without first determining whether data needed by the instruction is valid or available. Schedulers 230 are to dispatch instructions from the front end 202 when the input data needed to execute the instructions is projected to be ready when the instruction would reach execution.

Processor 200 further includes a replay mechanism implemented via a checker 260, staging queues 250, and replay multiplexor 235. In addition replays can be done from the replay queue 220 when the checker 260 elects to do so. The replay system can replay instructions that were not executed correctly after they were scheduled by the schedulers 230. The execution units 240 can perform data speculation in executing an instruction. Execution units 240 can be an arithmetic logic unit (ALU), a floating point ALU, a memory generation unit, etc. The execution units 240 can also be collectively referred to as an execution cluster. Logic to perform semi-fast operations for 64 bit operands is also located in the execution units 240. One execution unit 240 of this embodiment includes logic 242 to perform semi-fast shift right operations on 64 bit operands in accordance with the present invention. A register file in the execution units 240 can store operands and other data for use during instruction execution and processing. Although the example of FIG. 2 shows one execution unit 240 and one staging queue 250 in order to simplify the description, multiple execution units 240 and staging queues 250 can be coupled to multiple schedulers 230. Execution units 240 may be coupled to multiple levels of memory devices from which data may be retrieved and to which data may be stored. In one embodiment, execution units 240 are coupled to L0 cache 244, L1 cache 246, and external memory devices 284, 286, 288, via memory request controller 242.

If data requested is not found in L0 cache 244 or L1 cache 246, execution units 240 may attempt to retrieve the needed data from additional levels of memory. Such requests may be made through memory request controller 242. An external bus interface 248 is coupled to memory request controller 242 and external bus 282. In one embodiment, external memory devices may includes L2 cache 284, main memory 286, disk memory 288, and other storage devices which may be coupled to external bus 282. Access to external memory devices is much slower than access to the on-die cache memory. When attempting to load data to a register from memory, execution unit 240 attempts to load the data from each of the memory devices from fastest to slowest. In one embodiment, the fastest level of memory devices, L0 cache 244, is checked first, followed by L1 cache 246, L2 cache 284, main memory 286, and disk memory 288. The time to load memory increases as each additional memory level is accessed. When the needed data is eventually found, the data retrieved by execution units 240 can be stored in the fastest available memory device for future access.

The term "registers" is used herein to refer to the on-board processor storage locations that are used as part of macro-instructions to identify operands. In other words, the registers referred to herein are those that are visible from the outside of the processor (from a programmer's perspective). However, the registers described herein can be implemented by circuitry within a processor using any number of different techniques, such as dedicated physical registers, dynamically allocated physical registers using register renaming, combinations of dedicated and dynamically allocated physical registers, etc.

In this embodiment, staging queue 250 can delay instructions for a fixed number of clock cycles so that the report on problems in executing the instruction in the execution units 240 and the instruction may enter the checker 260 at the same moment in time. In various embodiments, the number of stages in staging queue 250 varies based on the amount of staging or delay desired in each execution channel. A copy of a dispatched instruction may be staged through staging queue 250 in parallel to being executed through execution units 240. In this manner, a copy of the instruction maintained in staging queues 250 is provided to checker 260. This copy of the instruction can be routed back to replay multiplexor 235 by checker 260 for re-execution if the instruction did not execute successfully.

In this architecture, a checker unit 260 is positioned after the execution core 240. The checker 260 can analyze the data dependency of the instruction and whether any error exists. Furthermore, the checker 260 also checks the condition of the result of the execution to determine whether replay is necessary. If an instruction has executed successfully, the checker 260 marks the instruction as completed and declares the instruction "replay safe". "Replay safe" instructions are forwarded to retire unit 270. For another embodiment, multiple checkers (a fast or early checker and a slow or late checker) can be used, and permit the detection of incorrect instruction execution at different points in the pipeline. Similarly, another embodiment can have multiple replay paths. Other conditions can also generate replays. The performance of the processor 200 can improve if instructions are replayed more quickly. The checker 260 is coupled to the retirement unit 270. The schedulers 230 and execution units 240 assume that everything is okay. The checker 260 and retirement unit 270 check for problems. After the execution, the micro-ops and results are temporarily stored to await commitment to architectural state. If there are no execution problems, the instructions are retired and the results committed to the architectural state.

Figure 3:
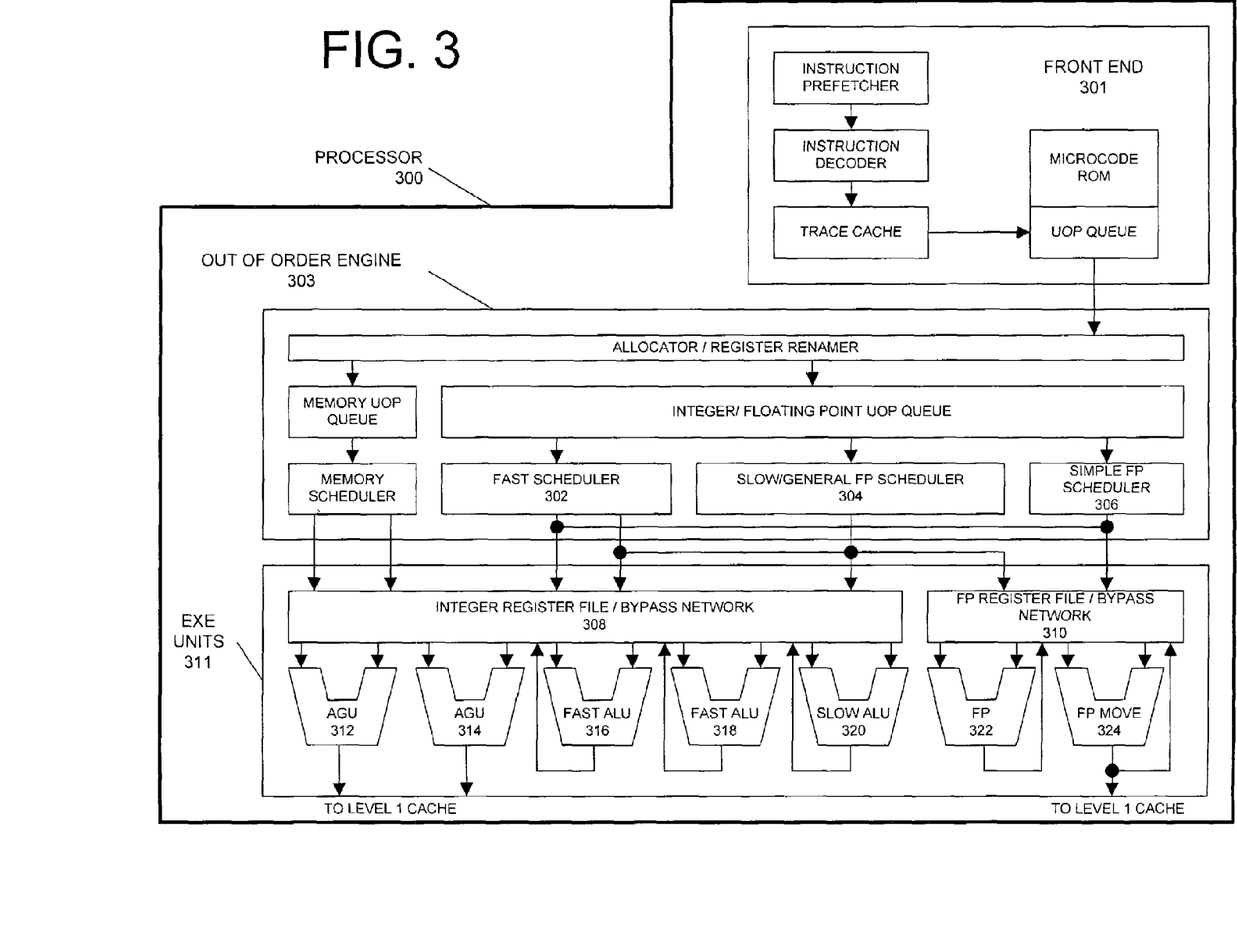
FIG. 3 is a block diagram of the micro-architecture for a processor of one embodiment that includes a staggered ALU to perform semi-fast operations in accordance with the present invention.

FIG. 3 is a block diagram of the micro-architecture for a processor of one embodiment that includes a staggered ALU to perform semi-fast operations in accordance with the present invention. The in-order front end 301 is the part of the processor 300 that fetches the macro-instructions to be executed and prepares them to be used later in the processor pipeline. The front end of this embodiment includes several units. The instruction prefetcher fetches macro-instructions from memory and feeds them to an instruction decoder which in turn decodes them into primitives called micro-instructions or micro-operations (also called micro op or uops) that the machine know how to execute. The trace cache takes decoded uops and assembles them into program ordered sequences or traces in the uop queue for execution. When the trace cache encounters a complex macro-instruction, the microcode ROM provides the uops needed to complete the operation.

The out-of-order execution engine 303 is where the micro-instructions are prepared for execution. The out-of-order execution logic has a number of buffers to smooth out and re-order the flow of micro-instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 302, slow/general floating point scheduler 304, and simple floating point scheduler 306. The uop schedulers 302, 304, 306, determine when a uop is ready to execute based on the readiness of their dependent input register operand sources and the availability of the execution resources the uops need to complete their operation. The fast scheduler 302 of this embodiment can schedule on each half of the main clock cycle while the other schedulers can only schedule once per main processor clock cycle. The schedulers arbitrate for the dispatch ports to schedule uops for execution.

Register files 308, 310, sit between the schedulers 302, 304, 306, and the execution units 312, 314, 316, 318, 320, 322, 324. There is a separate register file 308, 310, for integer and floating point operations, respectively. Each register file 308, 310, of this embodiment also includes a bypass network that can bypass or forward just completed results that have not yet been written into the register file to new dependent uops. For one embodiment, the integer register file is split into two separate register files, one register file for the low order 32 bits of data and a second register file for the high order 32 bits of data.

The execution units 311 are where the instructions are actually executed. This section includes the register files 308, 310, that store the integer and floating point data operand values that the micro-instructions need to execute. The processor 300 of this embodiment is comprised of a number of execution units: address generation unit (AGU) 312, AGU 314, fast ALU 316, fast ALU 318, slow ALU 320, floating point ALU 322, floating point move 324. For this embodiment, the floating point execution blocks 322, 324, execute floating point, MMX, and streaming single instruction multiple data (SIMD) extension operations. The simple, very frequent ALU operations go to the high-speed ALU execution units 316, 318. The fast ALUs 316, 318, of this embodiment can execute fast operations with an effective latency of half a clock cycle as described further below. For this embodiment, both of the fast ALUs 316, 318, are staggered ALUs capable of performing semi-fast operations such semi-fast right shifts, right rotates, byte swaps, conditional moves, flag checks, branches, etc. For one embodiment, most complex integer operations such as shift and rotate operations go to the slow ALU 320 as the slow ALU 320 includes integer execution hardware for long latency type of operations, such as a multiplier, shifts, flag logic, and branch processing. Memory load/store operations are executed by the AGUs 312, 314.

In this embodiment, the uops schedulers 302, 304, 306, dispatch dependent operations before the parent load has finished executing. As uops are speculatively scheduled and executed in processor 300, the processor 300 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor that includes a fast ALU to perform semi-fast operations are also designed to catch instruction sequences for semi-fast operations. If a replay occurs while an instruction sequence for a semi-fast operation is in flight, the replay mechanism can recognize the relationship between the various portions of the sequence and correctly replay the entire sequence with the correct timing boundaries.

Figure 4:
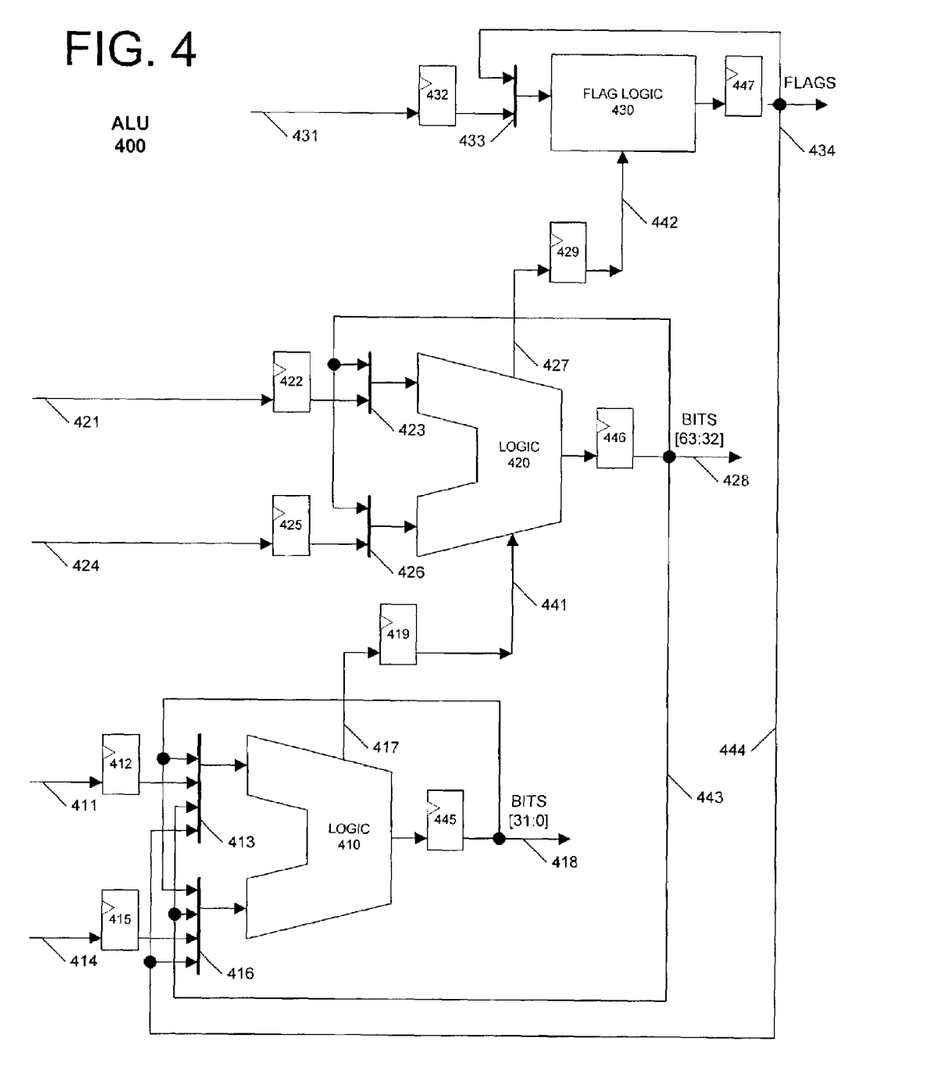
FIG. 4 is a block diagram of a staggered ALU in accordance with one embodiment of the present invention.

FIG. 4 is a block diagram of a staggered ALU 400 in accordance with one embodiment of the present invention. For this embodiment, the ALU 400 is designed to perform integer operations on 64 bit data operands. In alternative embodiments, the ALU 400 can be implemented to support a variety of data chucks including 16, 32, 128, 256, etc. The execution logic for the ALU 400 of this embodiment is comprised of three main portions: logic 410 for the low 32 bits, logic 420 for the high 32 bits, and flag logic 430. The low 32 bit logic 410 is to execute the operation specified by the uop on the lower 32 bits. Similarly, the high 32 bit logic 420 is to execute the operation on the higher 32 bits. The flag logic 430 is to signal errors, overflows, check results, comparison results, etc. and to provide appropriate flags 434. The logic blocks 410, 420, in this example are adders, but are not restricted as such. Thus the logic 410, 420, 430, can be implemented as suitable for that particular machine.

These logic blocks 410, 420, 430, can receive inputs from outside the ALU 400 on signal lines 411, 414, 421, 424, 431, via latches 412, 415, 422, 425, 432, respectively. For this embodiment, the outputs of each logic block 418, 428, 434, are also wired to feed back from respective latches 445, 446, 447, to the input terminals of its respective logic block 410, 420, 430, so that the immediate result can be used at the next clock cycle. Furthermore, the outputs 428, 434, of the later stages, high 32 logic 420 and flag logic 430, are wired back on signal lines 443, 444, from latches 446, 447, respectively to muxes 413, 416, at the input terminals for the low 32 logic 410. The muxes 413, 416, 426, 423, 433, control whether data internal or external to the ALU is used in the next operation. Thus the logic for the low 32 bits can have immediate access and use of the results of the later stages 420, 430, on the next clock cycle without the data on those outputs 428, 434, having to write back to a register file or propagated through logic external to the ALU 400. The carry bit 417 of the low 32 bit calculation is fed via latch 419 to the high 32 bit logic and the carry bit 427 of the high 32 bit calculation is fed via latch 429 to the flag logic for use on the respective following cycle.

The ALU 400 of this embodiment can perform integer operations at half the latency of the main clock. A typical fast operation can complete in a sequence of two to three fast clock cycles depending on how whether flag results are needed, wherein the fast clock runs at 2× the main clock rate. In the first fast clock, the lower 32 bits are computed at the low 32 bit logic 410 and are immediately available to feed the low 32 bit of a dependent operation the very next fast clock cycle. The high order 32 bits are processed in the next fast cycle using the carry out 417 just generated by the low 16 bit operation. This upper 16 bit result 428 is available to the next dependent operation when needed. The flags 434 are processed in a third fast cycle. Thus a uop is handled in three portions: the low 32 bits, the high 32 bits, and the flags. The execution of each portion is staggered from its immediately preceding portion.

Figure 5:
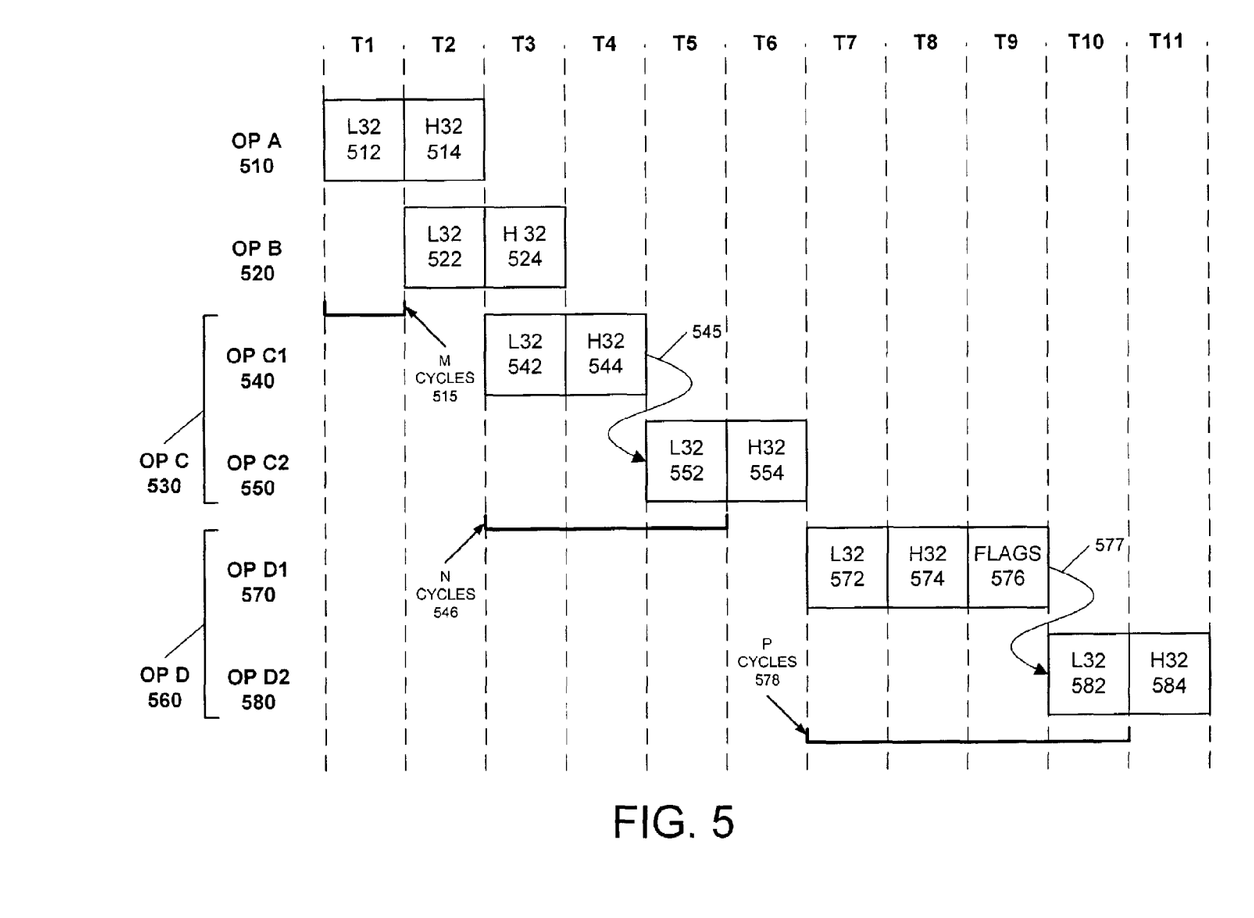
FIG. 5 is a timing diagram illustrating the flow of instructions for one embodiment of a method to execute an instruction with a semi-fast operation.

FIG. 5 is a timing diagram illustrating the flow of instructions for one embodiment of a method to execute an instruction with a semi-fast operation. In this example, four separate operations OP A 510, OP B 520, OP C 530, and OP D 560, are presented for execution. For this embodiment, each operation is based on an integer micro-instruction that is dispatched from a scheduler. The scheduler of this embodiment can take a single micro-instruction and break it down into two or more operations for execution. Furthermore, each operation is executed on a staggered ALU as a two (or three, if flags are involved) part sequence as described in the example of FIG. 4 above. For instance, the first micro-operation OP A 510 is executed over time cycles T1 and T2, wherein the low order 32 bits 512 are computed during T1 and the high order 32 bits 514 are computed during T2. Similarly, OP B 520 is executed during clock cycles T2 and T3. However, the low order 32 bits 522 of OP B 520 are scheduled to execute during the same clock cycle T2 as the high order 32 bits 514 of OP A 510. The high order 32 bits 524 of OP B 520 are operated on during T3. This arrangement is possible because the staggered ALU allows 32 bit portions of a 64 bit operand to execute separately at different clock cycles.

If OP B 520 is a fast integer micro-operation that is dependent on a fast integer micro-operation OP A 510, the resultant data from the operation on the low 32 bits 512 of OP A 510 is available at the end of time T1 and the operation on the low 32 bits 522 of succeeding operation OP B 520 can proceed at time T2. Thus the total amount of time from when the data for the low order 32 bits 512 of OP A 510 is read until the time the results from an operation on that data is available for use is M clock cycles 515 long. For this example, M is equal to one. In other words, the effective latency of OP A 510 is one fast clock cycle.

On the other hand, micro-operation OP C 530 is processed in accordance to one embodiment of the present invention. OP C 530 is a non-simple or complex operation that generally cannot complete in two cycles or even be processed in a fast ALU without using an embodiment of the present invention. Examples of complex micro-operations include right shifts, right rotations, conditional moves, flag manipulation, byte swaps, etc. Micro-operations of these types are typically sent to the slow ALU for handling by separate hardware. A number of these complex micro-operations require data from the high order portion of the operand or the flags register. However, high order data/results and flags are not readily available for use during operation of the low order portion because such high order data/results and/or flags have not yet been generated. For this embodiment, the high order 32 portion is not operated on until after the low order 32 portion has completed, and the flags are not generated until after the high order 32 portion has completed.

In this example OP C 530 is divided up into two individual, but bound and dependent, sub-operations OP C1 540 and OP C2 550. OP C1 540 is processed such that the low order bits 542 are processed at T3 and the high order bits 544 at T4. However, instead of staggering OP C2 550 so that the low order bits 552 of OP C2 550 are processed at T4 like in the OP A/B example above, OP C2 550 is pushed out to T5 and T6. Thus the low order bits 552 of OP C2 550 are delayed by a fast clock cycle. This delay is inserted by the scheduler in accordance to an embodiment of the present invention. OP C1 540 essentially performs the function of fetching the needed data for OP C2 550. The data needed to complete the low portion 552 of OP C2 550 is propagated back from the high portion 544 of OP C1 540 at the end of T4. T5 is the earliest time the low portion of OP C 530 can properly execute because the needed data is not yet available during the first pass of the operation on the low portion at T3.

For example, if OP C 530 is a right shift operation, in order to properly process the low order 32 bits, the low order portion needs to have some data from the high order 32 bits. However, data from the high order bits are not available until a clock cycle later. By having OP C1 540 fetch the needed data into the ALU during T3 and T4, and feeding that data to the low order portion of the ALU, OP C2 550 is ready to go right away at T5. Thus the low order portion 552 of OP C2 550 is dependent on the results of the high order portion 544 of OP C1 540. The latency from when the low 32 bits of OP C1 540 enter the ALU until the final data is ready for the low 32 bits of OP C2 560 is N clock cycles 546 in this embodiment. In this example, N is equal to three. For OP C 530, OP C1 540 is coupled, or bound in time, with OP C2 550. Being bound in time in this case means being separated by a required number clock cycles. So here, OP C2 550 has to be separated from OP C1 540 by exactly two clock cycles. The spread between the operations is implementation and instruction dependent and can be a number greater than or less than two in other embodiments. The scheduler of this embodiment dispatches the operations with the proper time gap in between.

Thus when OP C1 540 is processed and the data from the high order portion 544 becomes available and is routed in the ALU to the logic for the lower order bits of the next operation, the dependent operation for low order 32 bits of OP C2 550 have to be ready in that ALU to receive the data and to be executed. The data from the high portion 544 of OP C1 540 is not sent to the register file and is bypassed into the low portion ALU logic. If OP C2 550 is not scheduled and dispatched at the proper time, the data from the high order operation of OP C1 540 and the dependent low order operation of OP C2 550 will not meet up correctly. For example operation OP C 530, the flags are not operated on or used. If OP C 530 is in flight when a replay occurs in the processor, the replay mechanism of one embodiment recognizes the relationship between OP C1 540 and OP C2 550. If and when these operations are replayed, the time latency and execution order are maintained so that the low portion 552 of OP C2 550 is ready to receive and use data from high portion of OP C1 540 the following clock cycle.

Micro-op OP D 560 is another operation to be processed as a semi-fast operation. In this example, OP D 560 is processed as two portions: OP D1 570 and OP D2 580. OP D 560 can also be referred to as a fused uop, while OP D1 570 and OP D2 580 are referred to as uops. The first uop OP D1 570 comprising of a low order operation 572, a high order operation 574, and a flags operation 576, are processed during T7, T8, and T9, respectively. Micro-operation OP D 560 involves the use of one or more bits from the flag register to be used in the operation of the lower order 32 bits. Thus OP D2 580 is scheduled to execute at T10 after the data from the OP D2 flags are available. The flags are forwarded 577 during T9 from the flags logic to the execution logic of the low order bits for use with the low portion operation 582 of OP D2 580. The latency for a uop such as OP D 560 involving flags in conjunction with the low order register is P cycles 578. In this example, P is equal to four. For this embodiment, OP D1 570 is bound in time with OP D2 580 by three clock cycles.

Although the example instructions and operations of FIG. 5 are described with the use of particular clock latencies and number of clock cycles, other embodiments are possible depending on the particular implementation. For example, the value of M, N, and P in the description of the latency for a uop is not restricted to one, three, and four, respectively. The operation spread (M, N, and P) can take on a variety of different values that are greater than or less than the numbers describe above based on factors such as, but not limited to, the function of the micro-instruction, memory requirements, signal bussing, clocking schemes, scheduler operation, complexity of the operation, etc.

Figure 6:
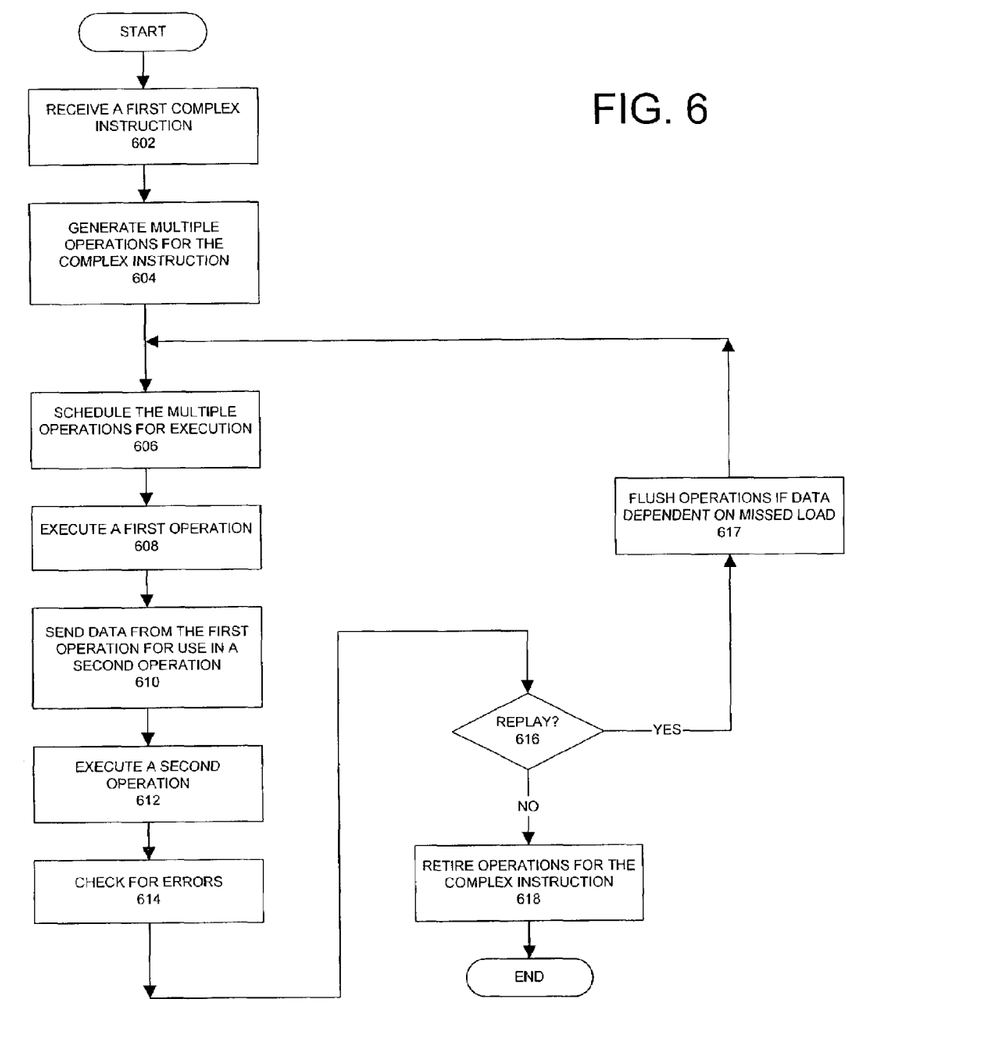
FIG. 6 is a flow chart illustrating one embodiment of a method to execute an instruction with a semi-fast operation.

FIG. 6 is a flow chart illustrating one embodiment of a method to execute an instruction with a semi-fast operation. At block 602, a first complex instruction is received for processing. This complex instruction can also be referred to as a micro-instruction, micro-operation, or fused uop. The scheduler can either schedule this complex instruction for execution at a slow ALU, which can take a large number of clock cycles to complete. Alternatively, the processor can employ one embodiment of a method in accordance with the present invention and process the instruction with a fast ALU as a sequence of semi-fast operations. The method of one embodiment can provide faster program execution and thus better overall performance. In utilizing embodiments of the present invention, the amount of complex logic needed for complex instruction may be reduced and the throughput of such instructions increases through the use of numerous fast ALUs.

At block 604, the method of this embodiment generates multiple operations for the complex instruction of block 602. For this embodiment and the present discussion, the number of multiple operations. For example, a shift right micro-op can be organized into two portions by the scheduler for execution in a fast ALU. The first operation is to prepare data for the second operation. The second operation actually completes the processing of the operand as directed by the complex instruction. Thus the first operation of a shift right uop can get bits from the high order portion of the operand ready for use with in processing of the low order portion of the operand in the second operation. Similarly, flag bits can be prepared in the first operation for use with the low order portion of the operand in the second operation.

At block 606, the first and second operations of this embodiment are scheduled by a scheduler for execution in a staggered integer ALU. The scheduler of this embodiment can determine the necessary timing in order for the two operations to execute correctly as the second operation needs to be ready to receive the data passed from the first operation during execution in the ALU. The second operation is dependent on the first operation for data. Thus the first and second operations are bound in time and have to be staggered by a proper number of clock cycles. The first operation is executed at block 608. The needed data from the first operation, the high order bits as in the shift right instruction, are sent at block 610 for use by the dependent second operation on the next clock cycle. This data bypasses the register file and is sent from the high order logic in the ALU to the low order logic. The second operation is executed at block 612. During the execution of the lower order portion of the second operation, data from the high order portion and/or flags of the first operation is available for use. Thus the desired operation on the low order portion as specified by the complex instruction can complete.

A check for errors is made at block 614. If an error exists, the instruction can be sent for replay and restarted from the beginning of the flow. For this embodiment, a replay mechanism is available. Because both the first and second operations are speculatively executed before the checker, the sources have to be checked before instruction retirement. Here, both operations are appropriately marked for replay or as safe after checks are made. At block 616, the replay mechanism and scheduler are checked to determine whether any relevant load operations failed and if a replay is necessary. If the operations of this instruction has been speculatively executed with data dependent on the missed load, then both the operations are flushed at block 617. The operations are rescheduled and dispatched for execution again at block 606. If no errors are found and a replay is not needed at block 616, the two operations are retired together as the original complex instruction at block 618.

Although the above examples describe the execution of an instruction as semi-fast operations in the context of a execution units and logic circuits, other embodiments of the present invention can be accomplished by way of software. Such software can be stored within a memory in the system. Similarly, the code can be distributed via a network or by way of other computer readable media. For instance, a computer program may be distributed through a computer readable medium such as a floppy disk or a CD ROM, or even a transmission over the Internet. Thus, a machine-readable medium can include any mechanism for storing or transmitting information in a form readable by a machine (e.g., a computer). For example, a machine-readable medium can include a read only memory (ROM), random access memory (RAM), magnetic disk storage media, optical storage media, flash memory devices, and electrical, optical, acoustical or other forms of propagated signals (e.g., carrier waves, infrared signals, digital signals, etc.).

The discussions and examples above are in the context of 64 bit processors and 64 bit data operands. However, the present invention is not limited as such and can be applied with other types of processors and data operands. For instance, alternative embodiments of the present invention can be implemented to operate on 32 bit operands that comprise of 16 bit high/low portions or 16 bit operands having two 8 bit portions. Similarly, another embodiment of the present invention can be designed for 128 bit long data operands that have high 64 bit portions and low 64 bit portions.

In the foregoing specification, the invention has been described with reference to specific exemplary embodiments thereof. It will, however, be evident that various modifications and changes may be made thereof without departing from the broader spirit and scope of the invention as set forth in the appended claims. The specification and drawings are, accordingly, to be regarded in an illustrative rather than a restrictive sense.

What is claimed is:

1. An apparatus comprising:
a scheduler to receive a first micro-instruction, said scheduler to generate a first operation and a second operation for said first micro-instruction, said scheduler to further schedule said first and second operations for execution N clock cycles apart;
a staggered ALU coupled to said scheduler, said staggered ALU to execute said first and second operations, wherein said staggered ALU is a fast integer ALU comprised of a first logic to operate on lower order bits of an operand and a second logic to operate on high order bits of said operand and a flag logic to operate an flag bits, said staggered ALU wired to communicate results of said first operation from said second logic and said flag logic for use at said first logic by said second operation;

an integer register file coupled to said staggered ALU and said scheduler, said integer register file to provide said operand;

a checker coupled to said staggered ALU and said integer register file, said checker to check results of said first and second operations for any error;

a replay mechanism coupled to said checker and said scheduler, said replay mechanism to replay said first and second operations if said checker indicates presence of an error; and retirement logic coupled to said checker, said retirement logic to retire said first micro-instruction if said checker does not indicate any errors.

2. The apparatus of claim 1 further comprising a cache memory coupled to said register file, said cache memory to provide data to said integer register file for processing in said staggered ALU.

3. The apparatus of claim 2 wherein N equals two.

4. A processor comprising:

a scheduler to receive an instruction, said scheduler to generate a first operation and a second operation for said instruction, said scheduler to further schedule said first and second operations for execution N clock cycles apart, wherein said second operation is dependent on said first operation;

an integer register file coupled to execution unit, said integer register file to provide an operand for said instruction;

an execution unit coupled to said scheduler, said execution unit to execute said first and second operations, said execution unit wired to internally communicate data from said first operation for use on a subsequent clock cycle by said second operation, wherein said execution unit is comprised of a first logic to operate on lower order bits of said operand and a second logic to operate on high order bits of said operand and a flag logic to operate on flag bits;

a cache memory coupled to said register file, said cache memory to provide data to said integer register file for processing in said execution unit;

a checker coupled to said execution unit, said checker to check results of said first and second operations for any error;

a replay mechanism coupled to said checker and said scheduler, said replay mechanism to replay said first and second operations if said checker indicates presence of an error; and retirement logic coupled to said checker, said retirement logic to retire said operations if said checker does not indicate any errors.

5. The processor of claim 4 wherein said second operation is to be executed on a clock cycle immediately following completion of said first operation.

6. The processor of claim 5 wherein said internally communicated data is comprised of higher order resultant bits and said flag values from said first operation, wherein said higher order resultant bits and said flag values are used to process a lower order bits portion of said second operation.

7. The processor of claim 6 wherein N equals two.

8. A processor comprising:

a scheduler to receive an instruction, said scheduler to generate a first operation and a second operation for said instruction, said scheduler to further schedule said first and second operations for execution N clock cycles apart, wherein said second operation is dependent on said first operation;

an execution unit coupled to said scheduler, said execution unit to execute said first and second operations, said execution unit wired to internally communicate data from said first operation for use on a subsequent clock cycle by said second operation;

a checker coupled to said execution unit, said checker to check results of said first and second operations for any error;

a replay mechanism coupled to said checker and said scheduler, said replay mechanism to replay said first and second operations if said checker indicates presence of an error.

9. The processor of claim 8 wherein said execution unit is comprised of a first logic to operate on lower order bits of said operand and a second logic to operate on high order bits of said operand and a flag logic to operate on flag bits.

10. The processor of claim 9 wherein said internally communicated data is comprised of higher order resultant bits and said flag values from said first operation, wherein said higher order resultant bits and said flag values are used to process a lower order bits portion of said second operation.

11. A system comprising:

a memory;

a processor bus coupled with the memory to transmit data signals to and from the memory; and a processor coupled with the processor bus to transmit data signals to and from the memory, the processor comprising:

a scheduler to receive a first micro-instruction, said scheduler to generate a first operation and a second operation for said first micro-instruction, said scheduler to further schedule said first and second operations for execution N clock cycles apart;

a staggered ALU coupled to said scheduler, said staggered ALU to execute said first and second operations, wherein said staggered ALU is comprised of a first logic to operate on lower order bits of an operand and a second logic to operate on high order bits of said operand and a flag logic to operate on flag bits, said staggered ALU wired to communicate results of said first operation from said second logic and said flag logic for use at said first logic by said second operation;

a checker coupled to said staggered ALU and said integer register file, said checker to check results of said first and second operations for any error; and a replay mechanism coupled to said checker and said scheduler, said replay mechanism to replay said first and second operations if said checker indicates presence of an error.

12. The system of claim 11 wherein the processor further comprises retirement logic coupled to said checker, said retirement logic to retire said operations if said checker does not indicate any errors.

13. The system of claim 11 wherein N equals two.

* * * * *